US012681442B2

(12) United States Patent
Lu et al.

(10) Patent No.: US 12,681,442 B2
(45) Date of Patent: Jul. 14, 2026

(54) POWER CONVERTER LOOP GAIN IDENTIFICATION AND COMPENSATION USING A MACHINE-LEARNING MODEL

(71) Applicant: Analog Devices, Inc., Wilmington, MA (US)

(72) Inventors: Wenjie Lu, Arlington, MA (US); Cecelia China Chu, Cambridge, MA (US); Michael Christian Holloway, Colorado Springs, CO (US); Jindong Zhang, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 431 days.

(21) Appl. No.: 18/103,155

(22) Filed: Jan. 30, 2023

(65) Prior Publication Data

US 2023/0280810 A1 Sep. 7, 2023

Related U.S. Application Data

(60) Provisional application No. 63/304,179, filed on Jan. 28, 2022.

(51) Int. Cl.
| | |
|---|---|
| *G05B 13/02* | (2006.01) |
| *G06F 1/28* | (2006.01) |
| *H02M 1/00* | (2006.01) |
| *H02M 3/157* | (2006.01) |

(52) U.S. Cl.
CPC ........... *G05B 13/0265* (2013.01); *G06F 1/28* (2013.01); *H02M 1/0003* (2021.05); *H02M 3/157* (2013.01)

(58) Field of Classification Search
CPC ............ G05B 13/0265; H02M 1/0003; H02M 3/157; G06F 1/28
See application file for complete search history.

(56) References Cited

U.S. PATENT DOCUMENTS

| | | | |
|---|---|---|---|
| 2006/0049792 A1 | 3/2006 | Chen et al. | |
| 2020/0195141 A1* | 6/2020 | Schwabe | ................... G06F 1/26 |
| 2020/0408832 A1* | 12/2020 | Hovis | ................ G01R 31/2851 |

(Continued)

FOREIGN PATENT DOCUMENTS

| | | |
|---|---|---|
| DE | 3529591 A1 | 2/1987 |
| DE | 19815896 A1 | 10/1999 |

(Continued)

OTHER PUBLICATIONS

International Search Report and Written Opinion in PCT/US2023/061597, mailed Apr. 26, 2023, 14 pages.

*Primary Examiner* — Gary Collins
(74) *Attorney, Agent, or Firm* — ArentFox Schiff LLP

(57) ABSTRACT

Technologies are provided for identification of closed-loop gain response and compensation of power supply devices. In an aspect, a computing device can receive data indicative of a transient output voltage of a power supply device. The computing device also can determine frequency-domain loop response of a control loop of the power supply device by applying a machine-learned model to the data indicative of the transient output voltage. In addition, or in other aspects, the computing device also can adjust one or multiple compensation component(s) of the power supply device in order to achieve a satisfactory performance during operation of the power supply device.

20 Claims, 10 Drawing Sheets

(56)                References Cited

U.S. PATENT DOCUMENTS

| | | | |
|---|---|---|---|
| 2022/0302838 A1* | 9/2022 | Eleftheriadis ......... | H02M 3/156 |
| 2023/0176532 A1 | 6/2023 | Tsuneki | |
| 2023/0238800 A1* | 7/2023 | Musunuri .............. | G06F 1/324 |
| | | | 700/295 |

FOREIGN PATENT DOCUMENTS

| | | | |
|---|---|---|---|
| DE | 102008003299 A1 | 7/2009 |
| JP | 2000278988 A | 10/2000 |
| JP | 2020-205691 A | 12/2020 |
| WO | 2020/249226 A1 | 12/2020 |
| WO | 2021/251226 A1 | 12/2021 |

* cited by examiner

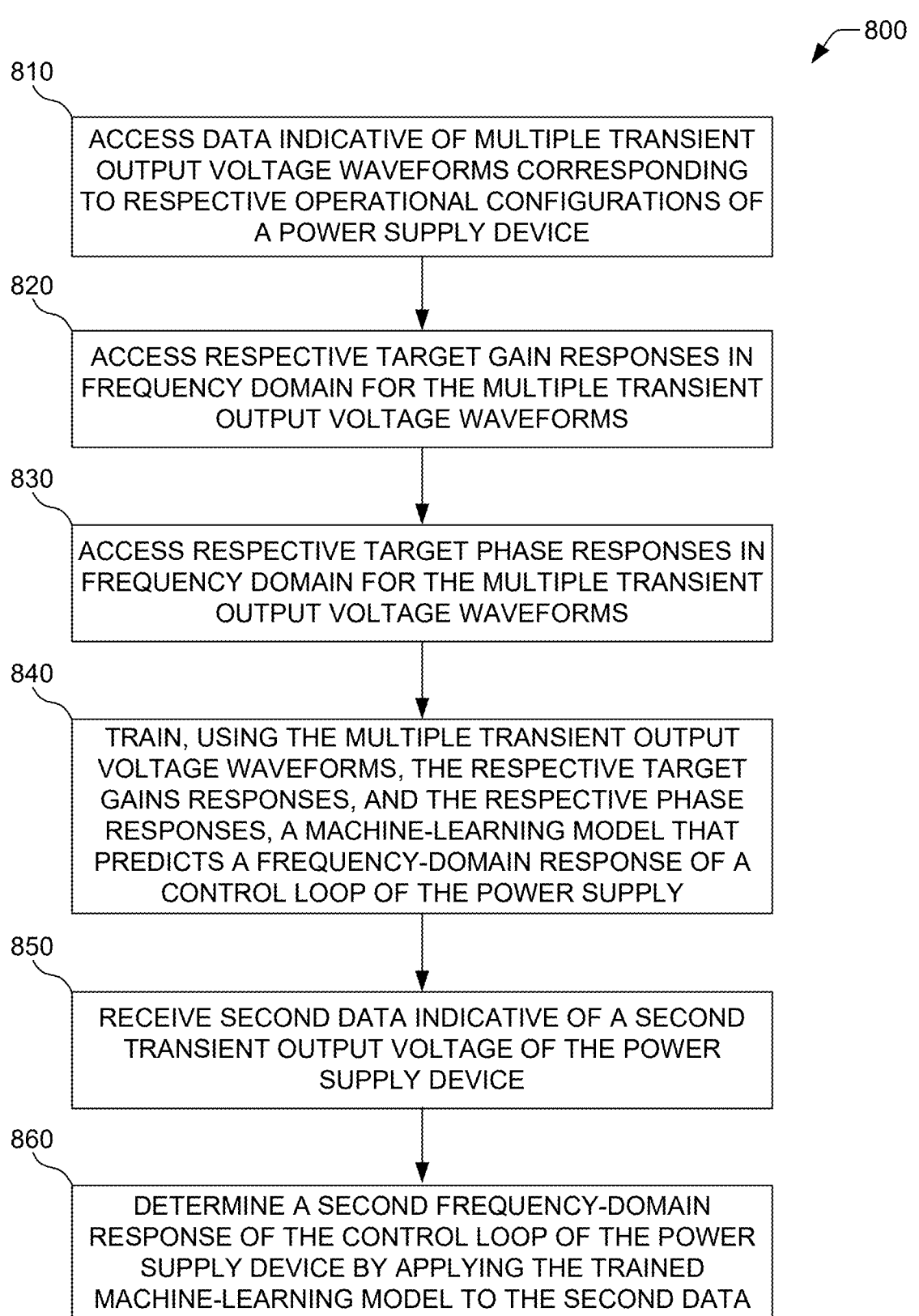

810 — ACCESS DATA INDICATIVE OF MULTIPLE TRANSIENT OUTPUT VOLTAGE WAVEFORMS CORRESPONDING TO RESPECTIVE OPERATIONAL CONFIGURATIONS OF A POWER SUPPLY DEVICE

820 — ACCESS RESPECTIVE TARGET GAIN RESPONSES IN FREQUENCY DOMAIN FOR THE MULTIPLE TRANSIENT OUTPUT VOLTAGE WAVEFORMS

830 — ACCESS RESPECTIVE TARGET PHASE RESPONSES IN FREQUENCY DOMAIN FOR THE MULTIPLE TRANSIENT OUTPUT VOLTAGE WAVEFORMS

840 — TRAIN, USING THE MULTIPLE TRANSIENT OUTPUT VOLTAGE WAVEFORMS, THE RESPECTIVE TARGET GAINS RESPONSES, AND THE RESPECTIVE PHASE RESPONSES, A MACHINE-LEARNING MODEL THAT PREDICTS A FREQUENCY-DOMAIN RESPONSE OF A CONTROL LOOP OF THE POWER SUPPLY

850 — RECEIVE SECOND DATA INDICATIVE OF A SECOND TRANSIENT OUTPUT VOLTAGE OF THE POWER SUPPLY DEVICE

860 — DETERMINE A SECOND FREQUENCY-DOMAIN RESPONSE OF THE CONTROL LOOP OF THE POWER SUPPLY DEVICE BY APPLYING THE TRAINED MACHINE-LEARNING MODEL TO THE SECOND DATA

FIG. 8

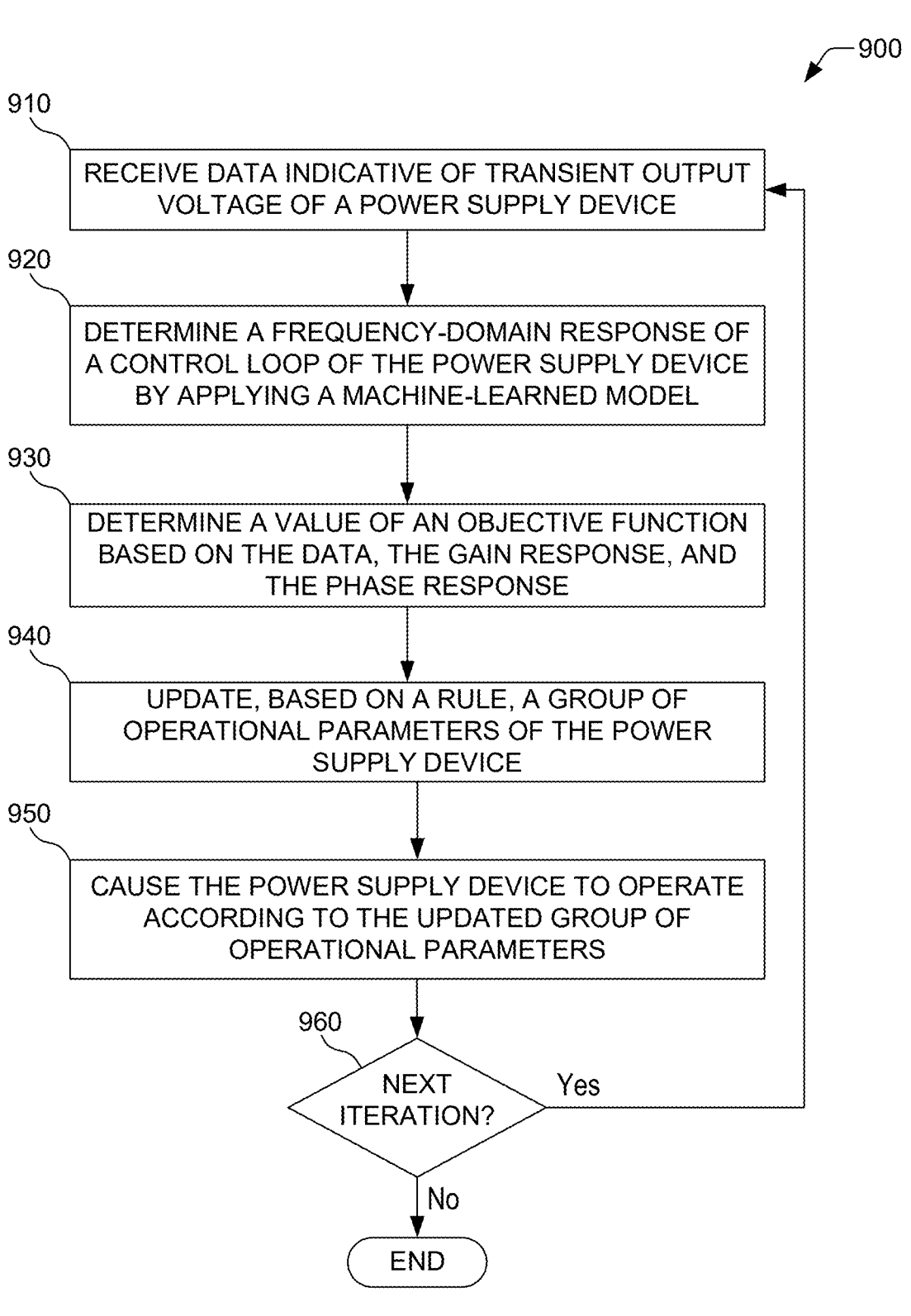

900

910
RECEIVE DATA INDICATIVE OF TRANSIENT OUTPUT VOLTAGE OF A POWER SUPPLY DEVICE

920
DETERMINE A FREQUENCY-DOMAIN RESPONSE OF A CONTROL LOOP OF THE POWER SUPPLY DEVICE BY APPLYING A MACHINE-LEARNED MODEL

930
DETERMINE A VALUE OF AN OBJECTIVE FUNCTION BASED ON THE DATA, THE GAIN RESPONSE, AND THE PHASE RESPONSE

940
UPDATE, BASED ON A RULE, A GROUP OF OPERATIONAL PARAMETERS OF THE POWER SUPPLY DEVICE

950
CAUSE THE POWER SUPPLY DEVICE TO OPERATE ACCORDING TO THE UPDATED GROUP OF OPERATIONAL PARAMETERS

960
NEXT ITERATION?          Yes

No

END

FIG. 9

POWER CONVERTER LOOP GAIN IDENTIFICATION AND COMPENSATION USING A MACHINE-LEARNING MODEL

CROSS-REFERENCE TO RELATED APPLICATION

This application claims the benefit of and priority to U.S. Provisional Patent Application No. 63/304,179, filed Jan. 28, 2022, the contents of which application are hereby incorporated by reference herein in their entirety.

BACKGROUND

Frequency response of a control loop in a switched-mode power supply device can be identified using network analyzers. Such identification involves measurements on the power supply device. Performing the measurements is a rather cumbersome, time-consuming process. That process also can be intrusive in that the measurements typically involve opening the control loop and injecting a perturbation signal into the power supply device.

Compensation of a control loop also involves specialized analysis that can be intrusive and time-consuming. The use of commonplace modeling approaches can be limited and/or inaccurate in supporting the design of a control loop that yields satisfactory performance of a power supply device. When available, commonly used analytical linearized models can yield inadequate compensation results in view of nonlinearities that may be present in the operation of a power supply device that incorporates the control loop. To compound such an issue, parameters of power components that constitute the power supply device can change over time and/or over operating conditions. As a result, a control loop design that is satisfactory in theory, at a particular time and given particular operating conditions, can become inadequate in practice.

Therefore, much remains to be improved in technologies for analysis and compensation of control loops in power supply devices.

SUMMARY

One aspect includes a method that includes receiving data indicative of a transient output voltage of a power supply device. The method also includes determining a frequency-domain loop response of a control loop of the power supply device by applying a machine-learned model to the data indicative of the transient output voltage. Such a frequency-domain loop response can be referred to as loop gain frequency response. As is used herein, a machine-learned model is a machine-learning model that has been trained in accordance with aspects of this disclosure.

Another aspect includes a method that includes accessing data indicative of multiple transient output voltage waveforms corresponding to respective operational configurations of a power supply device. The method also includes accessing respective target gain responses in frequency domain for the multiple transient output voltage waveforms, and accessing respective target phase responses in frequency domain for the multiple transient output voltage waveforms. The method further includes training, using multiple transient output voltage waveforms, a machine-learning model that predicts a frequency-domain loop response of a control loop of the power supply device.

Additional aspects include a computing device including at least one processor and at least one memory device storing processor-executable instructions that, in response to execution by the at least one processor, cause the computing device to: receive data indicative of a transient output voltage of a power supply device; and determine frequency-domain loop response of a control loop of the power supply device by applying a machine-learned model to the data indicative of the transient output voltage.

This Summary is not intended to emphasize any particular aspects of the technologies of this disclosure. Nor is it intended to limit in any way the scope of such technologies. This Summary simply covers a few of the many aspects of this disclosure as a straightforward introduction to the more detailed description that follows.

BRIEF DESCRIPTION OF THE DRAWINGS

The accompanying drawings form part of the disclosure and are incorporated into the subject specification. The drawings illustrate example aspects of the disclosure and, in conjunction with the following detailed description, serve to explain at least in part various principles, features, or aspects of the disclosure. Some aspects of the disclosure are described more fully below with reference to the accompanying drawings. However, various aspects of the disclosure can be implemented in many different forms and should not be construed as limited to the implementations set forth herein. Like numbers refer to like elements throughout.

FIG. 8 is a flowchart of an example of a method for predicting frequency-domain loop response of a control loop of a power supply device, in accordance with one or more aspects of this disclosure.

FIG. 9 is a flowchart of an example of a method for tuning performance of a power supply device, in accordance with aspects described herein.

BRIEF DESCRIPTION OF THE DRAWINGS

Figure 1:
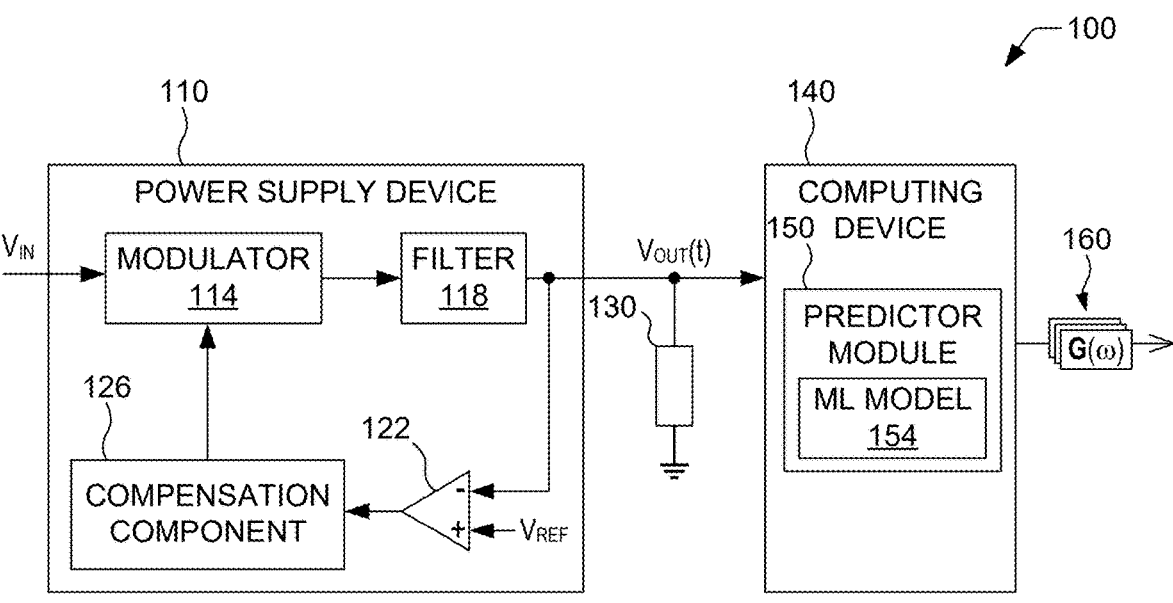
FIG. 1 is a schematic block diagram of an example of a system for prediction of loop gain frequency response of a power supply device using machine learning, in accordance with one or more aspects of this disclosure.

The present disclosure recognizes and addresses, amongst other technical challenges, the issues of identification of frequency-domain loop response of a control loop in switched-mode power supply devices and compensation of such a control loop. Identifying an optimal or nearly optimal configuration of the control can result in satisfactory performance and reliability of the power supply device. Power supply design and testing typically rely on intrusive measurements directed to probing frequency-domain loop response of the control loop. Such analysis can be time-consuming and involves the measuring or otherwise obtaining the frequency-domain loop response. Compensation of the control loop can be time-consuming. The compensation also involves the modeling of a control architecture that forms part of the power supply device. Yet, conventional models for some power control architectures may be unavailable, and even when available, those models can have limitations that may reduce the reliability of a design of a control loop.

As is described in greater detail below, aspects of the present disclosure include techniques, methods, and computing devices that, individually or collectively, permit efficient and non-intrusive identification of frequency response of a control loop of a power supply device, and also permit adjusting a configuration of the control loop in order to achieve and/or maintain a desired performance. To that end, in some aspects, a machine-learned model can be generated using time-domain data indicative of multiple transient output voltage waveforms and ground-truth frequency-domain loop responses of control loops. By using a large number (e.g., thousands or tens of thousands) of operational configurations of a control loop and/or other parts of a power supply device, the machine-learned model can be broadly applicable and can efficiently predict frequency-domain loop response of a control loop based on a transient output voltage waveform in time-domain. In addition, according to other aspects, configuration of a power supply device can be adjusted over time based on transient output voltage waveforms in time domain and predicted frequency-domain loop response of the control loop for those waveforms.

In contrast to existing technologies, aspects of this disclosure provide non-invasive identification of a frequency-domain loop response of a control loop under various operating conditions during operation of a power supply device that includes the control loop. Because transient output voltage waveforms are measured without injecting perturbation signals into the control loop, the identification of such frequency-domain loop responses is drastically faster (e.g., a few orders of magnitude, for example) than conventional approaches. For example, identification of the frequency-domain loop response of a control loop can be accomplished in approximately one minute using conventional approaches, after setting up an appropriate testbed. In sharp contrast, the same identification of the frequency-domain loop response of the control loop can be accomplished in less than about tens of milliseconds using the machine-learning approach of this disclosure. Additionally, because machine-learned models arise from measured transient output waveforms of a wide range of configurations of power supply devices, the machine-learned model incorporates effects of non-linearities and other characteristics of power elements that constitute a power supply device. As a result, predicted frequency-domain loop responses of control loops are more accurate than other frequency-domain loop responses modeled or otherwise obtained with conventional approaches. The efficiency and accuracy of the predictions of frequency-domain loop responses afforded by the present disclosure permit readily optimizing, improving, or otherwise achieving a satisfactory performance of a power supply device. An optimal or otherwise satisfactory performance can be efficiently maintained over time.

FIG. 1 is a schematic block diagram of an example system 100 for prediction of frequency-domain loop response of a control loop of a power supply device 110 using a machine-learned model, in accordance with one or more aspects of this disclosure. The example system 100 includes a power supply device 110 that can provide an output voltage to one or more load devices 130 (generically referred to as load device 130). Changes in operating conditions of the load device 130 can cause a transient output voltage Vout (t) at the output of the power supply device 110.

The power supply device 110 can be embodied in a switched-mode power converter. Thus, the power supply device 110 can include a modulator 114 that can receive an input voltage $V_{in}$ and can generate a time-dependent output voltage by modulating $V_{in}$. In some cases, the modulator 114 can apply pulse-width modulation (PWM) to modulate $V_{in}$. The power supply device 110 also can include an output filter 118 that can smooth the modulated output voltage provided by the modulator 114. The output filter 118 can be an RC filter, an LC filter, or other type of suitable filter.

Figure 2:
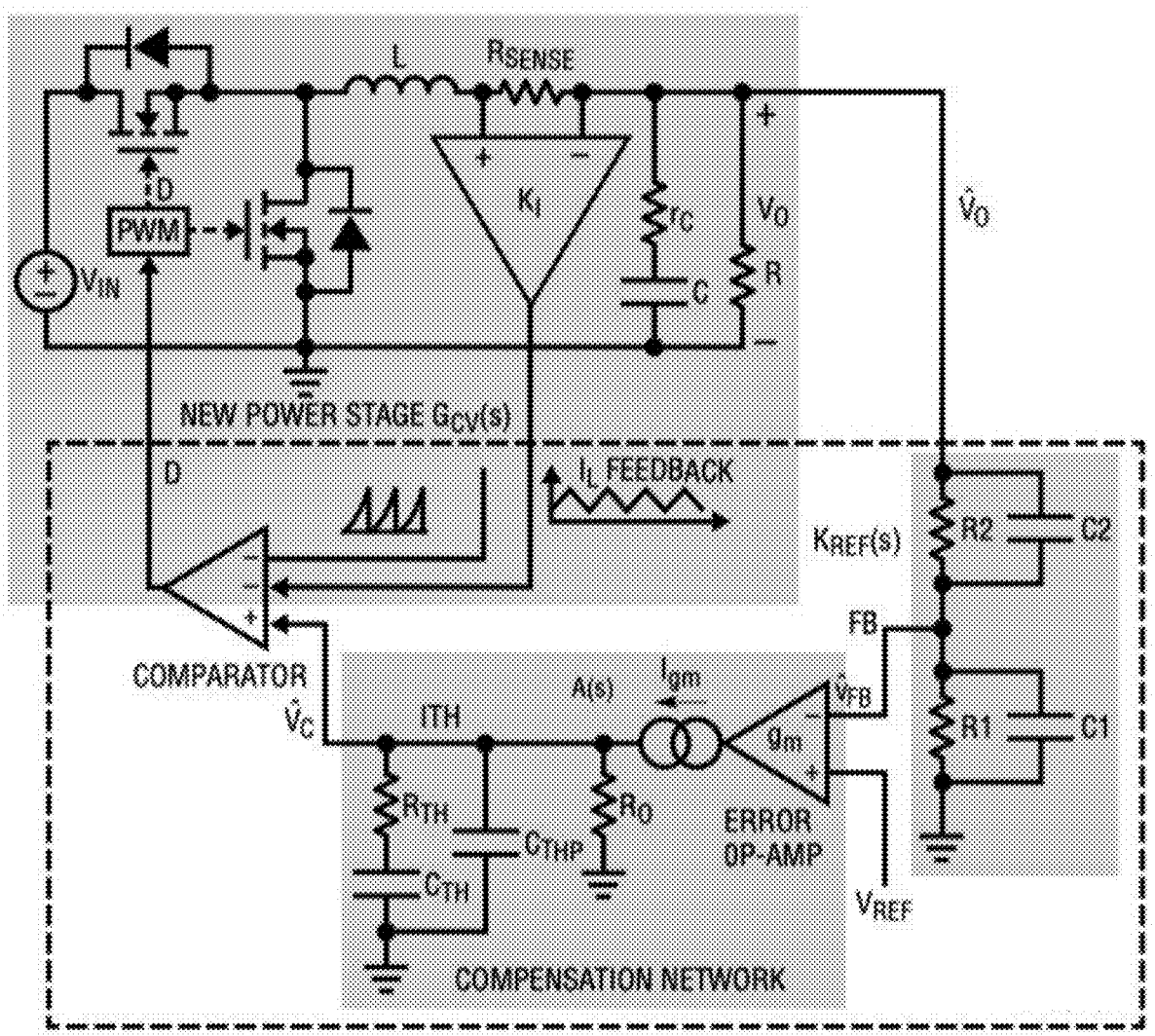
FIG. 2 is a diagram of an example of power supply circuitry coupled with compensation circuitry, in accordance with one or more aspects of this disclosure.

The power supply device 110 also can include a feedback control loop. The feedback control loop can receive the output voltage supplied to the load device 130. In response, the feedback control loop can cause the power supply device 110 to operate according to a desired or satisfactory performance even in the presence of transients due to changes in operating conditions of the load device 130. More specifically, the feedback control loop can include, for example, an error amplifier 122 and one or more compensation components 126 (generically referred to as compensation component 126). The error amplifier 122 also can receive a reference voltage VREF. The error amplifier 122 can send a result signal of a comparison between VREF and the output voltage to the compensation component 126. Based on the result signal, the compensation component 126 can adjust a group of operational parameters to cause the modulator 114 to operate such that an output voltage behaves according to the desired or satisfactory performance. The modulator 114, the output filter 118, the error amplifier 122, and the compensation component 126 can constitute a device that can be referred to as a power converter. Simply as an illustration, FIG. 2 presents circuitry of an example of the power supply device 110.

In the example system 100, output voltage from the power supply device 110 also can be provided to a computing device 140. Thus, the computing device 140 can receive transient output voltage of the power supply device 110. More specifically, the computing device 140 can obtain data indicative of the transient output voltage. The computing device 140 can determine, using the data, a frequency-domain loop response of a control loop of the power supply device 110. To that end, the computing device 140 can apply a machine-learned model 154 to the data indicative of the transient output voltage. The computing device 140 can retain the machine-learned model 154 in one or more memory devices (not shown in FIG. 1). The machine-learned model 154 is a machine-learning model that has been trained in accordance with aspects of this disclosure. Accordingly, the computing device 140 can identify a closed-loop gain of the power supply device 110 non-intrusively by applying the machine-learned model 154 to the transient output voltage of the power supply device 110. The computing device 140 includes various types of computing resources, such as a combination of one or multiple processors, one or multiple memory devices, one or multiple network interfaces (wireless or otherwise), one or multiple peripheral adapters, one or multiple input/output (I/O) interfaces or other types, or similar resources. The computing device 140 can have various degrees of complexity and form factors. In an example implementation, the computing device 140 can be part of an embedded system where the computing device 140 is assembled in a same package containing the power supply device 110.

The computing device 140 can supply data 160, defining the frequency-domain loop response of the control loop of the power supply device 110. Such a response is represented by $G(\omega)$ in FIG. 1, and can be referred to as loop gain frequency response. In some cases, the loop gain frequency response can be represented by a gain response and a phase response. In other cases, the closed-loop gain response can be represented simply by real and imaginary parts instead of gain and phase. The computing device 140 can supply the data 160 to a display device for visualization in a user interface, for example. In addition, or in some cases, the computing device 140 also can supply one or more performance metrics based on the loop gain frequency response. For example, the computing device 140 can determine, using the loop gain frequency response, a gain bandwidth, a gain margin, and a phase margin for the power supply device 110.

Figure 3:
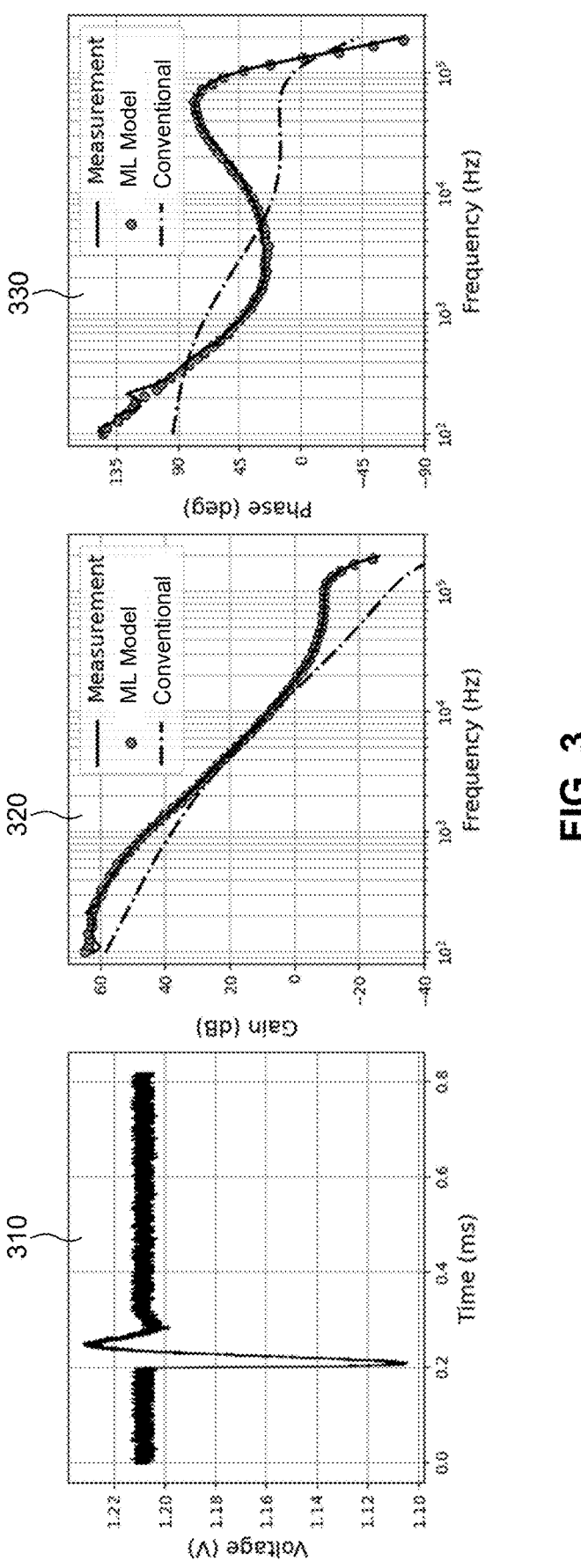
FIG. 3 includes plots of examples of transient output voltage, gain response in frequency domain, and phase response in frequency domain, in accordance with one or more aspects of this disclosure.

FIG. 3 includes a plot 310 of an example of a transient output voltage waveform that can serve as input to the machine-learned model 154. FIG. 3 also includes a plot 320 of gain response in frequency domain of a power supply that outputs the transient output voltage and a plot 330 of phase response in frequency domain of the power supply device. The power supply device can be the power supply device 110, for example. Plot 320 and Plot 330 present three traces, each representing an approach used to determine gain response and phase response in frequency domain. The approaches include measurement, machine-learning approach of this disclosure, and conventional modeling. It can be seen that for both gain response and phase response, the machine-learning approach predicts the observed data more accurately than the conventional approach. Without intending to be bound by modeling or interpretation, the greater prediction accuracy of the machine-learning approach may arise from the training of a machine-learning model using measured transient output voltage waveforms and measured loop gain frequency responses. By using such waveforms, the machine-learned model resulting from the training can incorporate various actual factors (e.g., parasitic capacitances) involved in the operation of a power supply device.

Figure 4A:
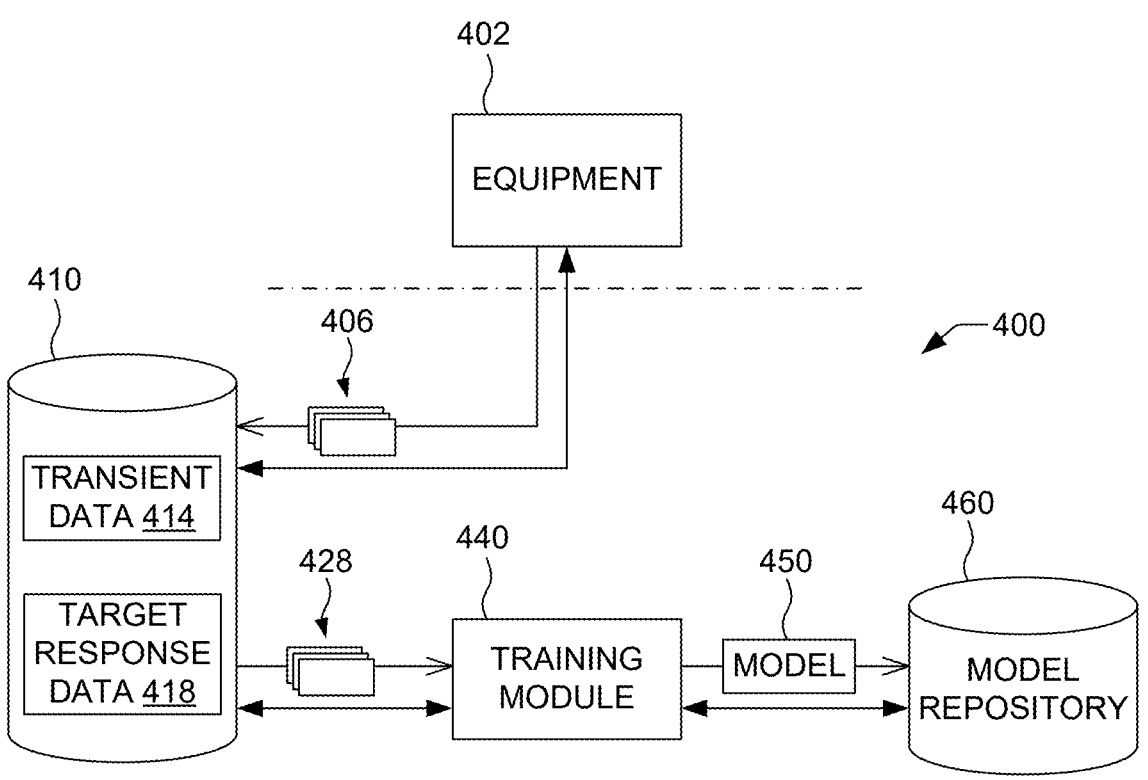
FIG. 4A is a block diagram of an example of a system to train a machine-learning model, in accordance with one or more aspects of this disclosure.

FIG. 4A illustrates an example system 400 to train a machine-learning model to predict a frequency-domain closed-loop response of a power supply device that includes a feedback control loop, in accordance with one or more aspects of this disclosure. The power supply device can be the power supply device 110 (FIG. 1). The machine-learning model can include a neural network, such as a convolutional neural network (CNN). In one example, the CNN can include an encoder section (also referred to as encoder model) and a decoder section (also referred to as decoder model). The machine-learning model can be defined by a set of parameters (or weights). In some cases, the set of parameters can have approximately 90,000 parameters. The disclosure is not limited in that respect, and machine-learning models having other number of parameters can be utilized.

The example system 400 includes data storage 410 that contains transient data 414 indicative of transient output voltage waveforms corresponding to respective operational configurations of the power supply device. In some cases, the operational configurations can be generated by changing several operational parameters of at least one compensation component that is part of the feedback control loop. In addition, or in other cases, other operational parameters of the power supply device can be varied in order to generate particular configurations of the power supply device. Equipment 402 (e.g., an oscilloscope) can generate the transient data 414 from measurements on hardware including the power supply device. The equipment 402 can supply the transient data 414 as part of other data 406 that also can be used in the training of a machine-learning model in accordance with aspects of this disclosure. As is represented by the dot-dashed line, the equipment 402 is not part of the example system 400. Besides an oscilloscope, the equipment 402 can include a frequency analyzer and/or other instruments.

The data storage 410 also contains target response data 418 indicative of target (or ground-truth) frequency-domain closed-loop responses for transient output voltage waveforms for the power supply device. The target response data 418 can correspond to the transient data 414. For instance, the data 418 can include first data indicative of respective first target frequency-domain closed-loop responses for multiple first transient output voltage waveforms, where the transient data 414 includes first data indicative of the multiple first transient output voltage waveforms. The equipment 402 (e.g., a frequency analyzer) can generate the data 418 from measurements on hardware that includes the power supply device. The equipment 402 can supply the data 418 as part of the data 406. A target (or ground-truth) frequency-domain closed-loop response can be represented as a target (or ground-truth) gain response and a target phase response in frequency domain. Such target gain response and target phase response can be denoted by $G(w)$ and @ $(w)$, respectively, where w represents frequency.

While in FIG. 4A the equipment 402 is shown a supplying the data 406 directly to the data storage 410, the disclosure is not limited in that respect. The data storage 410 can receive the transient data 414 and the target response data 418 from other type of devices other than the equipment 402, after such data has been generated by the equipment 402 or other equipment.

Having generated ground truths for respective multiple transient output voltages, a training module 440 included in the example system 400 can train a machine-learning model that predicts frequency-domain closed-loop response. To that end, the training module 440 can receive first data indicative of multiple transient output voltage waveforms and second data indicative of target frequency-domain closed-loop responses for respective ones of such waveforms. The first data and second data form a training dataset that the training module can operate upon to train the machine-learning model. More specifically, the training module 440 can generate, using the first data, respective feature vectors for the multiple transient output voltage waveforms. The training module 440 can then predict or otherwise determine, using the respective feature vectors, frequency-domain closed-loop responses by applying the machine-learning model that is being trained. In some cases, the training module 440 can predict or otherwise determine gain responses in frequency domain and model phase responses in frequency domain by applying a machine-learning model to the respective feature vectors. That is, for each one of the respective feature vectors, the training module 440 can generate a prediction $\hat{G}(\omega)$ of gain response

7

8 in frequency domain and a prediction $\hat{\Phi}(\omega)$ of gain response in frequency domain. The prediction $\hat{G}(\omega)$ can be referred to as predicted gain response in frequency domain and the prediction $\hat{\Phi}(\omega)$ can be referred to as predicted phase response in frequency domain.

The machine-learning model can be parameterized and, thus, the training module 440 can train the machine-learning model by determining a solution to an optimization problem with respect to a loss function based on (i) respective target gain responses for multiple transient output voltage wave-forms, (ii) respective target phase responses for the multiple transient output voltage waveforms, (iii) predicted gain responses for respective feature vectors corresponding to the multiple transient output voltage waveforms, and (iv) pre-dicted phase responses. Such a solution identifies a particu-lar set of parameters defining an optimized machine-learning model 450. The optimized machine-learning model 450 is referred to as a machine-learned model. The training module 440 can retain the machine-learned model 450 in data storge 460 (referred to as model repository simply for the sake of nomenclature). While data storage 410 and data storage 460 are shown separately in FIG. 4A, the disclosure is not limited in that respect and, in some cases, the data storage 410 and data storage 460 can indeed be part of a same data storage.

The loss function can be a weighted mean-square-error function, where each term in the loss function is weighted by a defined frequency-dependent function $W(\omega)$. Simply for purposes of illustration, $W(\omega)$ can be a piecewise linear function of @ that assigns greater weights near a cross-over frequency (where gain crosses 0 dB) of the power supply device, and also assigns lesser weights at high frequencies (e.g., above half of the switching frequency of the power supply device) where target closed-loop gain responses can be noisy. In cases where a machine-learning model is trained to predict gain response in frequency domain and phase response in frequency domain, the loss function can be the following:

$$ L = \frac{1}{N} \sum_{i=1}^{N} W(\omega) \left( \hat{G}_i(\omega) - G_i(\omega) \right)^2 + W(\omega) \left( \hat{\Phi}_i(\omega) - \Phi_i(\omega) \right)^2 \qquad \text{Eq. (1)} $$

where N is the number of elements in the training dataset; e.g., the number of configurations of a power supply device that can be achieved by changing operational parameters of a feedback control loop and/or other components of the power supply device. For example, N can be of the order of $10^4$.

Figure 4B:
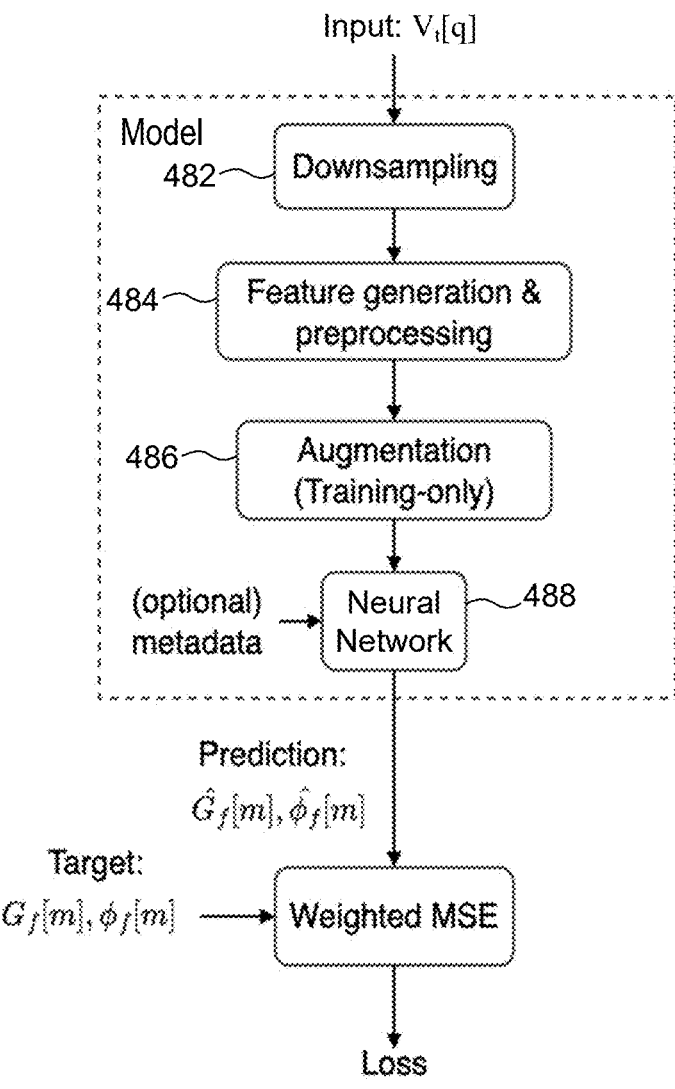
FIG. 4B is a block diagram of an example process flow for training a machine-learning model for prediction of closed-loop gain response of a power supply device, in accordance with one or more aspects of this disclosure.

FIG. 4B is a block diagram of an example process flow for training a machine-learning model to predict loop gain frequency response, in accordance with one or more aspects of this disclosure. The training module 440 can implement the process flow shown in FIG. 4B. The machine-learning model receives input data indicative of a transient output voltage waveform of the power supply device (e.g., power supply device 110). The input data can be defined in the time domain and can represent the transient output voltage wave-form as a time series having a defined number Q of elements. In one example, Q=8192. Such a waveform is denoted by $V_t[q]$ in FIG. 4B. The model can include a downsampling section 482 that, when applied to the waveform, results in a downsampled version of $V_t[q]$. The downsampled version of Vt[q] is referred to as $V_t[k]$ and has K elements, with K<Q. In one example, K=1024. The model also can include a feature generation and preprocessing section 484 that can generate feature vectors based on $V_t[k]$ (the downsampled version of $V_t[q]$). To generate a feature vector F[•], the feature generation and preprocessing section 484 can crop $V_t[k]$. In addition, or in some cases, the feature generation and preprocessing section 484 can operate on F[•]. In one example, the feature generation and preprocessing section 484 can normalize the vector to have a mean of zero and/or can apply a signal processing operation (e.g., smoothing). Parameters involved in the operations corresponding to the downsampling section 482 and the feature generation and preprocessing section 484 may not be updated during train-ing.

During training, the model can further include a data augmentation section 486 that can augment a feature vector before being supplied to a neural network 488 (e.g., a CNN) for prediction of loop gain frequency response. Augmenting a feature vector can include adding random variation to signals during training in order to improve model robust-ness. For example, the data augmentation section 486 can shift elements of the feature vector by respective random amounts and/or can add an amount of random noise. The amount of added noise can be sufficient to shift such elements while preserving the characteristics of the input waveform. By augmenting feature vectors during training (but not in testing/production), the model being trained can fit to relevant characteristics of the inputs instead of over-fitting to noise.

In some cases, metadata also can be used as an input to the neural network 488. The metadata can be known informa-tion of the power supply device. For example, the metadata can be indicative of a switching frequency of the power supply device and/or values of one or multiple compensation parameters. Such values can include, for example, resistor values and/or capacitance values. Metadata can be incorpo-rated in various ways. In some example implementations, the metadata can be added to an intermediate vector gener-ated by an intermediate layer of the neural network 488. More specifically, the intermediate vector can be generated by an output layer of the encoder section of the neural network 488. That intermediate vector results from the application of the encoder section to an augmented feature vector inputted into the neural network 448. The metadata can be added to the intermediate vector by adding the metadata entries (e.g., first metadata, second metadata, and so on) as additional elements of the intermediate vector. In other words, the metadata can be represented as a metadata vector and can be appended to the intermediate vector. Such addition results in an expanded vector that can be inputted into a decoder section of the neural network 488. The neural network 488 can generate output by applying the decoder section (or decoder model) to that expanded vector.

Regardless of whether metadata is used, the output of the neural network section 488 provides the output of the machine-learning model. The output is a model (or pre-dicted) loop gain frequency response. Such a response can be represented as a gain response and a phase response. Predicted closed-loop gain responses are evaluated relative to target closed-loop gain responses using a loss function (e.g., weighted MSE), as described herein.

Because a machine-learned model in accordance with aspects of this disclosure can provide sufficient knowledge of the control-loop transfer function of a power supply device, the machine-learned model can be used to configure a control feedback loop automatically. One or more com-pensation components in the control feedback loop can thus be adjusted non-intrusively in response to changes in oper-ating conditions of a load device during the operation of the power supply device. In that way, the power supply device can be configured to provide satisfactory (e.g., optimal or nearly optimal, for example) performance over a wide range of operating conditions.

Figure 5:
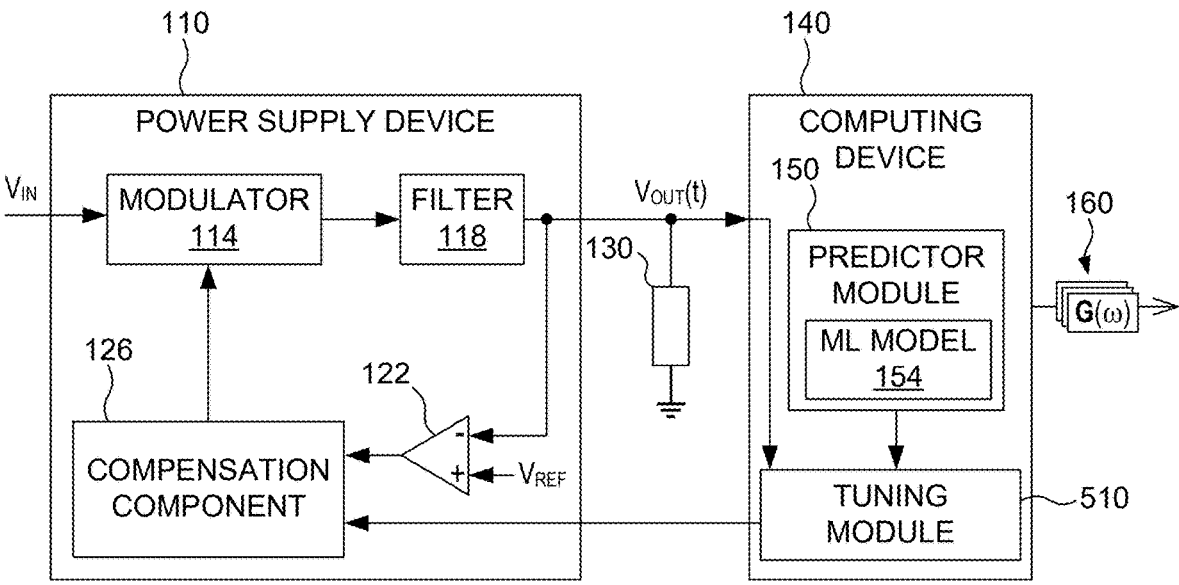
FIG. 5 is a schematic block diagram of an example of a system for tuning a compensation device that configures operation of a power supply device, in accordance with one or more aspects of this disclosure.

To that end, as is illustrated in the example system 500 in FIG. 5, the computing device 140 can include a tuning module 510 that can adjust one or multiple operational parameter(s) of the compensation component 126 and, thus, can cause the power supply device 110 to operate according to such operational parameter(s). The tuning module 510 can adjust the operational parameter(s) based on output voltage (e.g., transient output voltage) received from the power supply device 110 and a predicted frequency-domain closed-loop gain that is also based on the output voltage. The tuning module 510 can obtain the predicted frequency-domain closed-loop gain from the predictor module 150. The operational parameter(s) can include compensation parameters of a particular type of compensation device represented by the compensation component 126. Simply for purposes of illustration, in one example, the compensation device can be a Type II compensation network, and an operational parameter can be a Type II compensation parameter. In another example, the compensation device can be a Type III compensation network, and an operational parameter can be a Type III compensation parameter. In yet another example, for some types of digital controllers, the compensation device can include a proportional-integral-derivative (PID) controller, and an operational parameter can be a pole or a zero of the PID controller.

To identify one or more operational parameters that yield a satisfactory performance of the power supply device 110, the tuning module 510 can use an objective function. The objective function can be based on the transient output voltage waveform and/or frequency-domain closed-loop gain of the power supply device 110. The objective function can include a performance metric of the power supply device 110. Simply as an example, the objective function can be defined to maximize or otherwise achieve a desired gain bandwidth while maintaining 60° phase margin:

$$G_{opt} = \underset{g \in G}{\mathrm{argmax}}[BW(g) \cdot \mathbb{1}(PM(g) > 60°)], \qquad \text{Eq. (2)}$$

where G is a search space of closed-loop gains with all possible operational parameters.

More specifically, the tuning module 510 can determine a solution to an optimization problem with respect to the objective function, where the solution defines a particular group of operational parameters of the power supply device 110. Determining such a solution causes the power supply device 110 to operate according to the particular group of operational parameters. Simply as an illustration, in some cases, the group of operational parameters includes compensation parameters of a type II compensation network. The compensation parameters correspond, for example, to a value of an amplifier gain, a value of resistor, and a value of a capacitor.

As mentioned, the objective function can include a performance metric of the power supply device 110. The tuning module 510 can determine the solution to the optimization problem by iteratively adjusting the group of operational parameters until a termination criterion is satisfied. The group of operational parameters can be updated based on time-domain data indicative of transient output voltages of the power supply device 110 and model frequency-domain closed-loop gain. The predictor module 150 can generate the model frequency-domain closed-loop gains by applying the machine-learned model 154 to the time-domain data.

Simply for purposes of illustration, implementation of an iteration and a next consecutive iteration as part of iteratively adjusting the group of operational parameters is described herein. The tuning module 510 can determine, based on at least one of a transient output voltage or a predicted frequency-domain closed-loop response a first value of a performance metric (e.g., phase margin) of the power supply device 110. The tuning module 510 can then adjust the group of operational parameters based on an optimization rule. The optimization rule dictates how to transition between operating configurations (of the power supply) within in a space of operational parameters. In other words, the optimization rule dictates how to select a next configuration from a current configuration. Examples of the optimization rule include local greedy grid-search algorithm and Bayesian optimization algorithms. The tuning module 510 can cause the power supply device 110 to operate according to the adjusted group of operational parameters. To that end, in some cases, each operational parameter corresponds to a programmable element that constitutes the power supply device 110, and the tuning module 510 can send a programming instruction defining a desired value of the programmable element. Examples of the programmable element include a programmable resistor, a programmable capacitor, and a programmable amplifier gain. Another example of the programmable element is a programmable register. A particular register setting of the programmable register can define a location of a pole or zero in a control loop of the power supply device 110, and/or a slope or threshold level for a signal within the control loop.

In some cases, the tuning module 510 can determine that the termination criterion has not been satisfied. For example, the tuning module 510 can determine that the first value of the performance metric is less than a defined threshold value. In response to such a determination, the tuning module 510 can implement a next iteration. Specifically, the tuning module 510 can receive time-domain data indicative of a second transient output voltage of the power supply device 110. The tuning module 510 can then determine a second predicted frequency-domain closed-loop response of the power supply device 110 by applying the machine-learned model 154 to the time-domain data indicative of the second transient output voltage. The tuning module 510 can determine, based on at least one of second transient output voltage or a predicted frequency-domain closed-loop response, a second value of the performance metric. The tuning module 510 can then further adjust the group of operational parameters based on the optimization rule. The tuning module 510 can cause the power supply device 110 to operate according to the further adjusted group of operational parameters.

Figure 6:
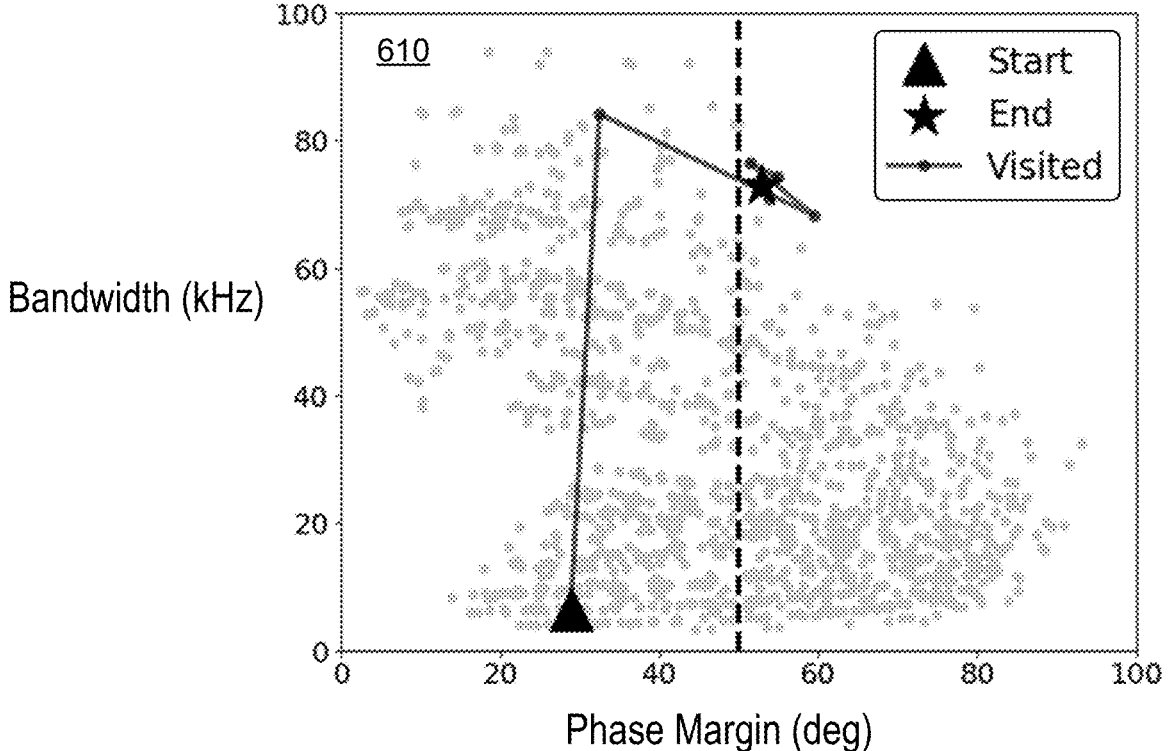
FIG. 6 is a plot of an optimization path in bandwidth-phase margin space, in accordance with one or more aspects of this disclosure.

In sharp contrast to existing technologies, the tuning module 510 can non-intrusively configure the power supply device 110 in response to changes in operating conditions of the load device 130 during operation of the power supply device 110. In some cases, the tuning module 510 can automatically and non-intrusively adjust the power supply device 110 to achieve the desired or otherwise satisfactory performance. Additionally, or in other cases, the tuning module 510 can automatically and non-intrusively cause the power supply device 110 to maintain the desired or otherwise satisfactory performance as the power supply device 110 operates. FIG. 6 is a plot 610 of an optimization path (represented by straight segments) in bandwidth-phase-margin space, in accordance with one or more aspects of this disclosure. The tuning module 510 can cause the power supply device 110 to achieve phase margin greater than a threshold value (e.g., fifty degrees (50°); represented by a dashed line) and high gain bandwidth in less than ten iterations, traversing the space of possible configurations of a group of operational parameters along the optimization path.

Figure 7:
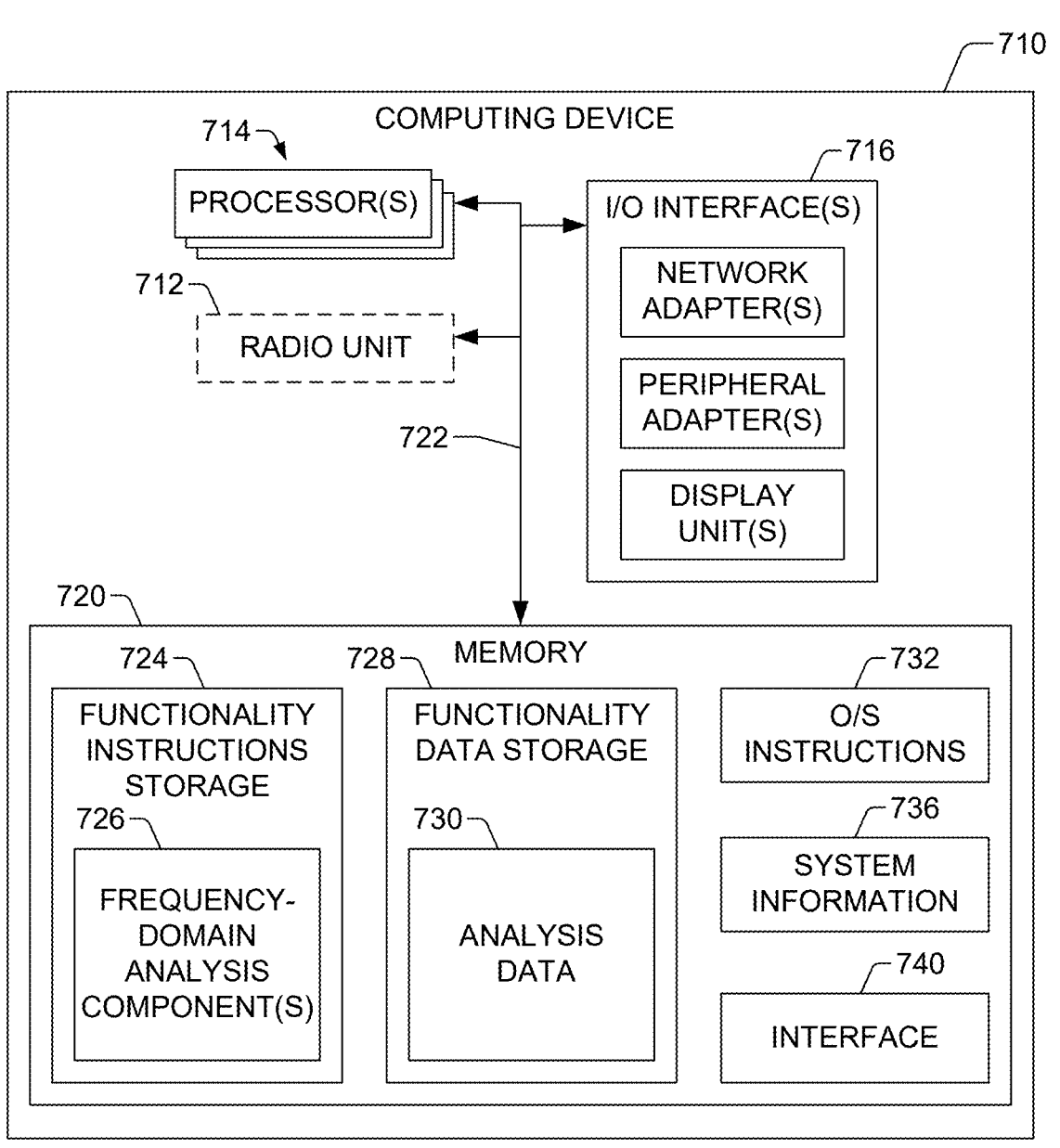
FIG. 7 is a block diagram of an example of a device that can provide various functionality of identification and adjustment of frequency-domain loop response of a control loop of a power supply device in accordance with one or more aspects of this disclosure.

FIG. 7 illustrates an example of a computing device 710 that can provide various functionality of identification and adjustment of frequency-domain loop response of a control loop of a power supply device in accordance with aspects of this disclosure. The type of components for frequency-domain analysis that the computing device 710 hosts can dictate the scope of frequency-domain analysis functionality that the computing device 710 provides. In some cases, the computing device 710 can host, in memory, the training module 440, the predictor module 150, and the tuning module 510. Hence, the computing device 710 can generate a machine-learned model (e.g., machine-learned model 154), and also can apply the machine-learned model to time-domain data indicative of transient output voltages in order to identify frequency-domain loop response of a control loop of a power supply device in accordance with aspects of this disclosure. In other cases, the computing device 710 can host the training module 440. In yet other cases, the computing device 710 can host the predictor module 150 and/or the tuning module 510. Simply as an example, the computing device 710 can embody, or can include, the computing device 140. Accordingly, in some cases, the computing device 710 can either generate a machine-learned model to predict the frequency-domain loop response of the control loop of the power supply device or can apply the machine-learned model to time-domain data indicative of a transient voltage output of the power supply device.

The computing device 710 can provide such functionality in response to execution of one or more software components retained within the computing device 710. Such component(s) can render the computing device 710 a particular machine for analysis of frequency-domain loop response of a control loop of a power supply device, among other functionalities that the computing device 710 may have. A software component can be embodied in or can comprise one or more processor-accessible instructions, e.g., processor-readable and/or processor-executable instructions. In one scenario, at least a portion of the processor-accessible instructions can embody and/or can be executed to perform at least a part of one or more of the example methods or techniques disclosed herein. The one or more processor-accessible instructions that embody a software component can be arranged into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors 714 integrated into the computing device 710.

The various example aspects of the disclosure can be operational with numerous other general-purpose or special-purpose computing system environments or configurations. Examples of well-known computing devices, systems of computing systems, environments, and/or configurations that can be suitable for implementation of various aspects of the disclosure in connection with analysis of frequency-domain loop response of a control loop of a power supply device can include personal computers; server computers; laptop devices; handheld computing devices, such as mobile tablets or electronic-book readers (e-readers); wearable computing devices; and multiprocessor systems. Additional examples can include programmable consumer electronics, network personal computers (PCs), minicomputers, mainframe computers, blade computers, programmable logic controllers, distributed computing environments that comprise any of the above systems or devices, and the like.

As is illustrated in FIG. 7, the computing device 710 includes one or multiple processors 714, one or multiple input/output (I/O) interfaces 716, one or more memory devices 720 (referred to as memory 720), and a bus architecture 722 (referred to as bus 722) that functionally couples various functional elements of the computing device 710. The computing device 710 can include, optionally, a radio unit 712. The radio unit 712 can include one or more antennas and a communication processing unit that can permit wireless communication between the computing device 710 and another device, such as a remote computing device and/or a remote sensor. The bus 722 can include at least one of a system bus, a memory bus, an address bus, or a message bus, and can permit the exchange of information (data and/or signaling) between the processor(s) 714, the I/O interface(s) 716, and/or the memory 720, or respective functional elements therein. In some cases, the bus 722 in conjunction with one or more internal programming interfaces 740 (also referred to as interface 740) can permit such exchange of information. In cases where the processor(s) 714 include multiple processors, the computing device 710 can utilize parallel computing.

The I/O interface(s) 716 can permit communication of information between the computing device 710 and an external device, such as another computing device. Such communication can include direct communication or indirect communication, such as the exchange of information between the computing device 710 and the external device via a network or elements thereof. As is illustrated, the I/O interface(s) 716 can include one or more of network adapter(s), peripheral adapter(s), and display unit(s). Such adapter(s) can permit or facilitate connectivity between the external device and one or more of the processor(s) 714 or the memory 720. For example, the peripheral adapter(s) can include a group of ports, which can include at least one of parallel ports, serial ports, Ethernet ports, V.35 ports, or X.21 ports. In certain aspects, the parallel ports can comprise General Purpose Interface Bus (GPIB), IEEE-1284, while the serial ports can include Recommended Standard (RS)-232, V.11, Universal Serial Bus (USB), FireWire or IEEE-1394.

The I/O interface(s) 716 can include a network adapter that can functionally couple the computing device 710 to one or more remote computing devices or sensors (not depicted in FIG. 7) via one or more traffic and signaling pipes that can permit or otherwise facilitate the exchange of traffic and/or signaling between the computing device 710 and such one or more remote computing devices or sensors. Such network coupling provided at least in part by the network adapter can be implemented in a wired environment, a wireless environment, or both. The information that is communicated by the network adapter can result from the implementation of one or more operations of a method in accordance with aspects of this disclosure. The I/O interface(s) 716 can include more than one network adapter in some cases.

In addition, or in some cases, depending on the architectural complexity and/or form factor of the computing device 710, the I/O interface(s) 716 can include a human-machine interface unit that can permit control of the operation of the computing device 710, or can permit conveying or revealing the operational conditions of the computing device 710. The human-machine interface can be embodied in, or can include, a display unit. The display unit can include a display device that, in some cases, has touch-screen functionality. In addition, or in some cases, the display unit can include lights, such as light-emitting diodes, that can convey an operational state of the computing device 710.

The bus 722 can have at least one of several types of bus structures, depending on the architectural complexity and/or form factor of the computing device 710. The bus structures can include a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like.

The computing device 710 can include a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Examples of computer-readable non-transitory storage media include any available media that can be accessed by the computing device 710, including both volatile media and non-volatile media, and removable and/or non-removable media. The memory 720 can include computer-readable media in the form of volatile memory, such as random access memory (RAM), and/or non-volatile memory, such as read-only memory (ROM).

The memory 720 can include functionality instructions storage 724 and functionality data storage 728. The functionality instructions storage 724 can include computer-accessible instructions that, in response to execution (by at least one of the processor(s) 714, for example), can implement one or more of the functionalities of this disclosure in connection with analysis of frequency-domain loop response of a control loop of a power supply device. The computer-accessible instructions can embody, or can include, one or more software components illustrated as frequency-domain analysis component(s) 726. Execution of at least one component of the frequency-domain analysis component(s) 726 can implement one or more of the methods described herein. Such execution can cause a processor (e.g., one of the processor(s) 714) that executes the at least one component to carry out at least a portion of the methods disclosed herein. In some cases, the frequency-domain analysis component(s) 726 can include the training module 440, the predictor module 150, and the tuning module 510. In other cases, the frequency-domain analysis component(s) 726 can include the training module 740. In yet other cases, the frequency-domain analysis component(s) 726 can include the predictor module 150 and/or the tuning module 510.

A processor of the processor(s) 714 that executes at least one of the frequency-domain analysis component(s) 726 can retrieve data from or retain data in one or multiple memory elements 730 in the functionality data storage 728 in order to operate in accordance with the functionality programmed or otherwise configured by the frequency-domain analysis component(s) 726. The one or multiple memory elements 730 may be referred to as analysis data 730. Data stored in the one or multiple memory elements 730 can include at least one of code instructions, data structures, or similar. For instance, at least a portion of such data structures can be indicative of a machine-learned model (e.g., machine-learned model 154 or machine-learned model 450) and/or other data in accordance with aspects of this disclosure. That other data can include, for example, time-domain data and frequency-domain data. More specifically, the one or multiple memory elements 730 can include the transient data 414 (FIG. 4A) and the target response data 418 (FIG. 4A). That is, the one or multiple memory elements 730 can include information present in the data storage 410 and/or the model repository 460.

The interface 740 (e.g., an application programming interface) can permit or facilitate communication of data between two or more components within the functionality instructions storage 724. The data that can be communicated by the interface 740 can result from implementation of one or more operations in a method of the disclosure. In some cases, one or more of the functionality instructions storage 724 or the functionality data storage 728 can be embodied in or can comprise removable/non-removable, and/or volatile/non-volatile computer storage media.

At least a portion of at least one of the frequency-domain analysis component(s) 726 or the frequency-domain analysis data 730 can program or otherwise configure one or more of the processors 714 to operate at least in accordance with the functionality described herein. One or more of the processor(s) 714 can execute at least one of the frequency-domain analysis component(s) 726, and also can use at least a portion of the data in the functionality data storage 728 in order to provide analysis of frequency-domain loop response of a control loop of a power supply device in accordance with one or more aspects described herein. In some cases, the functionality instructions storage 724 can embody or can comprise a computer-readable non-transitory storage medium having computer-accessible instructions that, in response to execution, cause at least one processor (e.g., one or more of the processor(s) 714) to perform a group of operations comprising the operations or blocks described in connection with example methods disclosed herein.

In addition, the memory 720 can include processor-accessible instructions and information (e.g., data, metadata, and/or program code) that permit or facilitate the operation and/or administration (e.g., upgrades, software installation, any other configuration, or the like) of the computing device 710. Accordingly, as illustrated, the memory 720 can include a memory element 732 (labeled operating system (O/S) instructions 732) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable O/S. The memory 720 also includes system information storage 736 having data, metadata, and/or program code that permits or facilitates the operation and/or administration of the computing device 710. Elements of the O/S instructions 732 and the system information storage 736 can be accessible or can be operated on by at least one of the processor(s) 714.

It should be recognized that while the functionality instructions 724 and other executable program components, such as the O/S instructions 732, are illustrated herein as discrete blocks, such software components can reside at various times in different memory components of the computing device 710, and can be executed by at least one of the processor(s) 714.

The computing device 710 can include a power supply (not shown), which can power up components or functional elements within such devices. The power supply can be a rechargeable power supply, e.g., a rechargeable battery, and it can include one or more transformers to achieve a power level suitable for the operation of the computing device 710 and components, functional elements, and related circuitry therein. In some cases, the power supply can be attached to a conventional power grid to recharge and ensure that such devices can be operational. To that end, the power supply can include an I/O interface (e.g., one of the interface(s) 716) to connect to the conventional power grid. In addition, or in other cases, the power supply can include an energy conversion component, such as a solar panel, to provide additional or alternative power resources or autonomy for the computing device 710.

In some scenarios, the computing device 710 can operate in a networked environment by utilizing connections to one or more remote computing devices, sensors, and/or power supply devices (not depicted in FIG. 7). As an illustration, a remote computing device can be a personal computer, a portable computer, a server, a router, a network computer, a peer device or other common network node, and so on. As described herein, connections (physical and/or logical) between the computing device 710 and a remote computing device or sensor can be made via one or more traffic and signaling pipes, which can comprise wired link(s) and/or wireless link(s) and several network elements (such as routers or switches, concentrators, servers, and the like) that form a local area network (LAN), a wide area network (WAN), and/or other networks (wireless or wired) having different footprints.

One or more of the techniques disclosed herein can be practiced in distributed computing environments, such as grid-based environments, where tasks can be performed by remote processing devices (e.g., network servers) that are functionally coupled (e.g., communicatively linked or otherwise coupled) through a network having traffic and signaling pipes and related network elements. In a distributed computing environment, one or more software components (such as program modules) may be located in both the computing device 710 and at least one remote computing device.

Example methods that can be implemented in accordance with this disclosure can be better appreciated with reference to FIGS. 8-9. For purposes of simplicity of explanation, example methods disclosed herein are presented and described as a series of acts. The example methods are not limited by the order of the acts, as some acts may occur in different orders and/or concurrently with other acts from that shown and described herein. In some cases, one or more example methods disclosed herein can alternatively be represented as a series of interrelated states or events, such as in a state diagram depicting a state machine. In addition, or in other cases, interaction diagram(s) (or process flow(s)) may represent methods in accordance with aspects of this disclosure when different entities enact different portions of the methodologies. It is noted that not all illustrated acts may be required to implement a described example method in accordance with this disclosure. It is also noted that two or more of the disclosed example methods can be implemented in combination with each other, to accomplish one or more functionalities described herein.

Methods disclosed herein can be stored on an article of manufacture in order to facilitate transporting and transferring such methodologies to computers or other types of information processing apparatuses for execution, and thus implementation, by a processor or for storage in a memory device or another type of computer-readable storage device. In one example, one or more processors that enact a method or combination of methods described herein can be utilized to execute program code retained in a memory device, or any computer-readable or machine-readable storage device or non-transitory media, in order to implement method(s) described herein. The program code, when configured in processor-executable form and executed by the one or more processors, causes the implementation or performance of the various acts in the method(s) described herein. The program code thus provides a processor-executable or machine-executable framework to enact the method(s) described herein. Accordingly, in some cases, each block of the flowchart illustrations and/or combinations of blocks in the flowchart illustrations can be implemented in response to execution of the program code.

FIG. 8 illustrates an example of a method for predicting frequency-domain loop response of a control loop of a power supply device, in accordance with one or more aspects of this disclosure. The example method 800 illustrated in FIG. 8 can be implemented by a single computing device or a system of computing devices. To that end, each computing device includes various types of computing resources, such as a combination of one or multiple processors, one or multiple memory devices, one or multiple network interfaces (wireless or otherwise), or similar resources. In some cases, each computing device can be embodied in the computing device 710 (FIG. 7).

In some cases, a system of computing devices implements the example method 800. The system is referred to as a computing system, and can host the training module 440, and the predictor module 150. The computing system can implement one or multiple blocks of the example method 800 in response to execution of the training module 440, and/or the predictor module 150. In some cases, each computing device in the system of computing devices can be embodied in the computing device 710 (FIG. 7).

At block 810, the computing system can access or otherwise receive (via the training module 440, for example) data indicative of multiple transient output voltage waveforms corresponding to respective operational configurations of a power supply device. The data can be defined in time domain.

At block 820, the computing system can access or otherwise receive (via the training module 440, for example) respective target gain responses in frequency domain for the multiple transient output voltage waveforms. To that end, in some cases, the computing system can receive first data indicative of the respective target gain responses in frequency domain for the multiple transient output voltage waveforms. The first data can be part of the data 418 (FIG. 4A), in some cases.

At block 830, the computing system can access or otherwise receive (via the training module 440, for example) respective target phase responses in frequency domain for the multiple transient output voltage waveforms. To that end, in some cases, the computing system can access or otherwise receive data (e.g., data 418 (FIG. 4A) indicative of the respective target gain responses in frequency domain for the multiple transient output voltage waveforms. The second data can be part of the data 418 (FIG. 4A), in some cases.

At block 840, the computing system can train, using (i) the multiple transient output voltage waveforms, (ii), the respective gain responses in frequency domain, (iii) and the respective phase responses in frequency domain, a machine-learning model that predicts a frequency-domain loop response of a control loop of the power supply. The computing system can train the machine-learning model via the training module 440, for example. The trained machine-learning model can be referred to as a machine-learned model. As is described herein, training the machine-learning model can include, for example, generating respective feature vectors for the multiple transient output voltage waveforms, and determining, using the respective feature vectors, predicted gain responses in frequency domain and predicted phase responses in frequency domain by applying a machine-learning model. Such training also can include determining a solution to an optimization problem with respect to a loss function based on the respective target gain responses, the respective target phase responses, the predicted gain responses, and the predicted phase responses, wherein the solution identifies a set of parameters defining an optimized machine-learning model. An example of the loss function is a weighted mean-square-error function, with each term in the loss function being weighted by a defined frequency-dependent function, as is shown in Eq. (1) above. In some example implementations, the computing system can train (via the training module 440, for example) the machine learning model by implementing the process flow shown in FIG. 4B. For example, the computing system can execute the training module 440 to implement the process flow shown in FIG. 4B.

At block 850, the computing system can access or otherwise receive (via the predictor module 150, for example) data indicative of a second transient output voltage of a power supply device.

At block 860, the computing system can determine (via the predictor module 150, for example) a second frequency-domain loop response of the control loop of the power supply by applying the machine-learned model to the second data. For example, the computing system can determine a gain response in frequency domain and a phase response in frequency domain of the power supply device by applying the machine-learned model to the data indicative of the second transient output voltage.

Blocks 810 to 840 can constitute a training process and blocks 850 and 860 can constitute a test or analysis process. Although the example method 800 is illustrated with reference to target gain responses and target phase responses, other representations (e.g., real part and imaginary part) of target closed-loop gain response can be utilized in the training process.

FIG. 9 illustrates an example of a method for adjusting operation of a power supply device, in accordance with one or more aspects of this disclosure. The example method 900 illustrated in FIG. 9 can be implemented by a single computing device or a system of computing devices. To that end, each computing device includes various types of computing resources, such as a combination of one or multiple processors, one or multiple memory devices, one or multiple network interfaces (wireless or otherwise), or similar resources. In some cases, each computing device can be embodied in the computing device 710 (FIG. 7).

In some cases, a computing device implements the example method 900. The computing device can be embodied in, or can include, the computing device 140 (FIG. 5). As such, the computing device can host the predictor module 150, and can implement one or multiple blocks of the example method 900 in response to execution of the predictor module 150 or the tuning module 510, or both.

At block 910, the computing device can receive data indicative of transient output voltage of the power supply device (e.g., power supply device 110). The data can be defined in time domain and can represent the transient output voltage as a time series having a defined number Q of elements. In one example, Q=8192.

At block 920, the computing device can determine a frequency-domain loop response of a control loop of the power supply device by applying a machine-learned model (e.g., the machine-learned model 154) to the data indicative of the transient output voltage.

At block 930, the computing device can determine a value of an objective function. The value can be determined based on at least one of the transient output voltage or the frequency-domain loop response of the control loop of the power supply.

A block 940, the computing device can update, based on a rule, a group of operational parameters. The rule can dictate how to select a next configuration of the group of operational parameters from a current configuration of the group of operational parameters. As is described herein, examples of the rule include local greedy grid-search algorithm and Bayesian optimization algorithms.

At block 950, the computing device can cause the power supply device to operate according to the updated group of operational parameters. To that end, the computing device can send a programming instruction defining a desired value for each programmable element corresponding to a respective parameter of the group of operational parameters. The one or more programmable elements constitute operational parameters of the power supply device. The programming instruction can be represented as a word having a defined number of bits.

At block 960, the computing device can determine if a next iteration of implementing blocks 910 to 950 is to be performed. An affirmative determination results in the computing device taking the "Yes" branch and directing the flow of the example method 900 to block 910. A negative determination results in the computing device terminating the example method 900.

After the example method 900 has terminated, a particular group of operational parameters of compensation component(s) and/or the power supply device has been determined.

Collectively, blocks 910 to 960 constitute an example process for determining a solution to an optimization problem with respect to the objective function based on at least one of the transient output voltage response in time domain or the frequency-domain loop response. The solution defines a group of operational parameters of compensation components of the power supply device.

Numerous other aspects emerge from the foregoing detailed description and annexed drawings. Those aspects are represented by the following Clauses.

A Clause 1 includes a method, where the method includes receiving data indicative of a transient output voltage of a power supply device; and determining a frequency-domain loop response of a control loop of the power supply device by applying a machine-learned model to the data indicative of the transient output voltage.

A Clause 2 includes Clause 1 and further includes: determining a solution to an optimization problem with respect to an objective function based on at least one of the transient output voltage response in time domain or the frequency-domain loop response, the solution defining a group of operational parameters of compensation components of the power supply device; and causing the compensation components of the power supply device to operate according to the group of operational parameters.

A Clause 3 includes any of the preceding Clauses 1 or 2, where the objective function comprises a performance metric of the power supply device, and where the determining the solution to the optimization problem comprises iteratively adjusting, based on second data indicative of second transient output voltages of the power supply device and second frequency-domain loop response of the control loop of the power supply device, the group of operational parameters until a termination criterion is satisfied.

A Clause 4 includes any of the preceding Clauses 1 to 3, where iteratively adjusting comprises: determining, based on at least one of the transient output voltage or the frequency-domain loop response, a first value of the performance metric; adjusting the group of operational parameters based on an optimization rule; causing the power supply device to operate according to the adjusted group of operational parameters; receiving third data indicative of a third transient output voltage of the power supply device; determining a third frequency-domain loop response of the control loop of the power supply device by applying the machine-learned model to the third transient output voltage; and determining, based on at least one of third transient output voltage or the third frequency-domain loop response, a second value of the performance metric.

A Clause 5 includes any of the preceding Clauses 1 to 4, where the group of operational parameters comprises compensation parameters of a compensation network, the compensation parameters corresponding to a value of an amplifier gain, a value of a resistor, and a value of a capacitor.

A Clause 6 includes any of the preceding Clauses 1 to 5, where a computing device receives the data indicative of the transient output voltage from the power supply device, wherein the computing device is external to the power supply device and is assembled in a same package containing the power supply device.

A Clause 7 includes a method, where the method includes accessing data indicative of multiple transient output voltage waveforms corresponding to respective operational configurations of a power supply device; accessing respective target gain responses in frequency domain for the multiple transient output voltage waveforms; accessing respective target phase responses in frequency domain for the multiple transient output voltage waveforms; and training, using the multiple transient output voltage waveforms, the respective target gain responses, and the respective phase responses, a machine-learning model that predicts a frequency-domain loop response of a control loop of the power supply device.

A Clause 8 includes Clause 7, where the training comprises generating respective feature vectors for the multiple transient output voltage waveforms; determining, using the respective feature vectors, predicted gain responses in frequency domain and predicted phase responses in frequency domain by applying a machine-learning model; and determine a solution to an optimization problem with respect to a loss function based on the respective target gain responses, the respective target phase responses, the predicted gain responses, and the predicted phase responses, wherein the solution identifies a set of parameters defining an optimized machine-learning model.

A Clause 9 includes any of the preceding Clauses 7 or 8, where the loss function is a weighted mean-square-error function, each term in the loss function being weighted by a defined frequency-dependent function.

A Clause 10 includes any of the preceding Clauses 7 to 9, where particular values of respective operational parameters of one or more compensation devices integrated with the power supply device define a particular operational configuration of the respective operational configurations.

A Clause 11 includes any of the preceding Clauses 7 to 10, where each one of the respective feature vectors has a dimension that is less than a second dimension of vectors representative of respective ones of the multiple transient output voltage waveforms.

A Clause 12 includes any of the preceding Clauses 7 to 11, where the generating the respective feature vectors comprises applying an encoder model to the vectors representative of the respective ones of the multiple transient output voltage waveforms.

A Clause 13 includes a computing device, where the computing device includes at least one processor; and at least one memory device storing processor-executable instructions that, in response to execution by the at least one processor, cause the computing device to: receive data indicative of a transient output voltage of a power supply device; and determine frequency-domain loop response of a control loop of the power supply device by applying a machine-learned model to the data indicative of the transient output voltage.

A Clause 14 includes the Clause 13, where the processor is further configured to: determine a solution to an optimization problem with respect to an objective function based on at least one of the frequency-domain loop response, the solution defining a group of operational parameters of compensation components of the power supply device; and cause the compensation components of the power supply device to operate according to the group of operational parameters.

A Clause 15 includes any of the preceding Clauses 13 or 14, where the objective function comprises a performance metric of the power supply device, and where determining the solution to the optimization problem comprises iteratively adjusting, based on second data indicative of second transient output voltages of the power supply device and second frequency-domain loop responses of the control loop of the power supply device, the group of operational parameters until a termination criterion is satisfied.

A Clause 16 includes any of the preceding Clauses 13 to 15, where the iteratively adjusting comprises: determining, based on at least one of the transient output voltage, the gain response, or the phase response, a first value of the performance metric; adjusting the group of operational parameters based on an optimization rule; causing the compensation device to operate according to the adjusted group of operational parameters; receiving third data indicative of a third transient output voltage of the power supply device; determining a third frequency-domain loop response of the control loop of the power supply device by applying the machine-learned model to the third transient output voltage; and determining, based on at least one of third transient output voltage or the third frequency-domain loop response, a second value of the performance metric.

A Clause 17 includes any of the preceding Clauses 13 to 16, where the machine-learned model includes a convolutional neural network having an encoder section and a decoder section.

A Clause 18 includes any of the preceding Clauses 13 to 17, where the power supply device comprises a switched modulated power converter.

A Clause 19 includes any of the preceding Clauses 13 to 18, where the power supply device comprises a switched-mode power converter, and wherein the compensation device comprises a compensation network.

A Clause 20 includes any of the preceding Clauses 13 to 19, where the group of operational parameters comprises compensation parameters of the compensation network, the compensation parameters corresponding to a value of an amplifier gain, a value of a resistor, and a value of a capacitor.

Various aspects of the disclosure may take the form of an entirely or partially hardware aspect, an entirely or partially software aspect, or a combination of software and hardware. Furthermore, as described herein, various aspects of the disclosure (e.g., systems and methods) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, and so forth.

Aspects of this disclosure are described herein with reference to block diagrams and flowchart illustrations of methods, systems, apparatuses, and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, a special-purpose computer, or another programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps, or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of aspects described in the specification or annexed drawings; or the like.

As used in this disclosure, including the annexed drawings, the terms "component," "module," "system," and the like are intended to refer to a computer-related entity or an entity related to an apparatus with one or more specific functionalities. The entity can be either hardware, a combination of hardware and software, software, or software in execution. One or more of such entities are also referred to as "functional elements." As an example, a component can be a process running on a processor, a processor, an object, an executable, a thread of execution, a program, and/or a computer. For example, both an application running on a server or network controller, and the server or network controller can be a component. One or more components can reside within a process and/or thread of execution and a component can be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which parts can be controlled or otherwise operated by program code executed by a processor. As yet another example, a component can be an apparatus that provides specific functionality through electronic components without mechanical parts, the electronic components can include a processor to execute program code that provides, at least partially, the functionality of the electronic components. As still another example, interface(s) can include I/O components or Application Programming Interface (API) components. While the foregoing examples are directed to aspects of a component, the exemplified aspects or features also apply to a system, module, and similar.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should be construed to mean "one or more" unless specified otherwise or clear from context to be directed to a singular form.

In addition, the terms "example" and "such as" are utilized herein to mean serving as an instance or illustration. Any aspect or design described herein as an "example" or referred to in connection with a "such as" clause is not necessarily to be construed as preferred or advantageous over other aspects or designs described herein. Rather, use of the terms "example" or "such as" is intended to present concepts in a concrete fashion. The terms "first," "second," "third," and so forth, as used in the claims and description, unless otherwise clear by context, is for clarity only and doesn't necessarily indicate or imply any order in time or space.

The term "processor," as utilized in this disclosure, can refer to any computing processing unit or device comprising processing circuitry that can operate on data and/or signaling. A computing processing unit or device can include, for example, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. In some cases, processors can exploit nano-scale architectures, such as molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

Simply as an illustration, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM). Additionally, the disclosed memory components of systems or methods herein are intended to comprise, without being limited to comprising, these and any other suitable types of memory.

Various aspects described herein can be implemented as a method, apparatus, or article of manufacture using standard programming and/or engineering techniques. In addition, various of the aspects disclosed herein also can be implemented by means of program modules or other types of computer program instructions stored in a memory device and executed by a processor, or other combination of hardware and software, or hardware and firmware. Such program modules or computer program instructions can be loaded onto a general-purpose computer, a special-purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any computer-readable device, carrier, or media. For example, computer readable media can include but are not limited to magnetic storage devices (e.g., hard drive disk, floppy disk, magnetic strips, or similar), optical discs (e.g., compact disc (CD), digital versatile disc (DVD), blu-ray disc (BD), or similar), smart cards, and flash memory devices (e.g., card, stick, key drive, or similar).

What has been described above includes examples of one or more aspects of the disclosure. It is, of course, not possible to describe every conceivable combination of components or methodologies for purposes of describing these examples, and it can be recognized that many further combinations and permutations of the present aspects are possible. Accordingly, the aspects disclosed and/or claimed herein are intended to embrace all such alterations, modifications and variations that fall within the spirit and scope of the detailed description and the appended claims. Furthermore, to the extent that one or more of the terms "includes," "including," "has," "have," or "having" is used in either the detailed description or the claims, such term is intended to be inclusive in a manner similar to the term "comprising" as "comprising" is interpreted when employed as a transitional word in a claim.

What is claimed is:

1. A method, comprising:
receiving data indicative of a transient output voltage of a power supply device; and
determining a frequency-domain loop response of a control loop of the power supply device by applying a machine-learned model to the data indicative of the transient output voltage.

2. The method of claim 1, further comprising:
determining a solution to an optimization problem with respect to an objective function based on at least one of the transient output voltage in time domain or the frequency-domain loop response, the solution defining a group of operational parameters of compensation components of the power supply device; and
causing the compensation components of the power supply device to operate according to the group of operational parameters.

3. The method of claim 2, wherein the objective function comprises a performance metric of the power supply device, and
wherein the determining the solution to the optimization problem comprises iteratively adjusting, based on second data indicative of second transient output voltages of the power supply device and second frequency-domain loop response of the control loop of the power supply device, the group of operational parameters until a termination criterion is satisfied.

4. The method of claim 3, wherein iteratively adjusting comprises:
determining, based on at least one of the transient output voltage or the frequency-domain loop response, a first value of the performance metric;
adjusting the group of operational parameters based on an optimization rule;
causing the power supply device to operate according to the adjusted group of operational parameters;
receiving third data indicative of a third transient output voltage of the power supply device;
determining a third frequency-domain loop response of the control loop of the power supply device by applying the machine-learned model to the third transient output voltage; and
determining, based on at least one of third transient output voltage or the third frequency-domain loop response, a second value of the performance metric.

5. The method of claim 2, wherein the group of operational parameters comprises compensation parameters of a compensation network, the compensation parameters corresponding to a value of an amplifier gain, a value of a resistor, and a value of a capacitor.

6. The method of claim 1, wherein a computing device receives the data indicative of the transient output voltage from the power supply device, wherein the computing device is external to the power supply device and is assembled in a same package containing the power supply device.

7. A method, comprising:

accessing data indicative of multiple transient output voltage waveforms corresponding to respective operational configurations of a power supply device;

accessing respective target gain responses in frequency domain for the multiple transient output voltage waveforms;

accessing respective target phase responses in frequency domain for the multiple transient output voltage waveforms; and training, using the multiple transient output voltage waveforms, the respective target gain responses and the respective target phase responses, a machine-learning model that predicts a frequency-domain loop response of a control loop of the power supply device.

8. The method of claim 7, wherein the training comprises:

generating respective feature vectors for the multiple transient output voltage waveforms;

determining, using the respective feature vectors, model gain responses in frequency domain and model phase responses in frequency domain by applying a machine-learning model; and determine a solution to an optimization problem with respect to a loss function based on the respective target gain responses, the respective target phase responses, the model gain responses, and the model phase responses, wherein the solution identifies a set of parameters defining an optimized machine-learning model.

9. The method of claim 8, wherein the loss function is a weighted mean-square-error function, each term in the loss function being weighted by a defined frequency-dependent function.

10. The method of claim 7, wherein particular values of respective operational parameters of one or more compensation devices integrated with the power supply device define a particular operational configuration of the respective operational configurations.

11. The method of claim 8, wherein each one of the respective feature vectors has a dimension that is less than a second dimension of vectors representative of respective ones of the multiple transient output voltage waveforms.

12. The method of claim 11, wherein the generating the respective feature vectors comprises applying an encoder model to the vectors representative of the respective ones of the multiple transient output voltage waveforms.

13. A computing device, comprising:

at least one processor; and at least one memory device storing processor-executable instructions that, in response to execution by the at least one processor, cause the computing device to:

receive data indicative of a transient output voltage of a power supply device; and determine frequency-domain loop response of a control loop of the power supply device by applying a machine-learned model to the data indicative of the transient output voltage.

14. The computing device of claim 13, wherein the at least one processor is further configured to:

determine a solution to an optimization problem with respect to an objective function based on at least one of the frequency-domain loop response, the solution defining a group of operational parameters of compensation components of the power supply device; and cause the compensation components of the power supply device to operate according to the group of operational parameters.

15. The computing device of claim 14, wherein the objective function comprises a performance metric of the power supply device, and wherein determining the solution to the optimization problem comprises iteratively adjusting, based on second data indicative of second transient output voltages of the power supply device and second frequency-domain loop responses of the control loop of the power supply device, the group of operational parameters until a termination criterion is satisfied.

16. The computing device of claim 15, wherein the iteratively adjusting comprises:

determining, based on at least one of the transient output voltage, a gain response, or a phase response, a first value of the performance metric;

adjusting the group of operational parameters based on an optimization rule;

causing a compensation device integrated with the power supply device to operate according to the adjusted group of operational parameters;

receiving third data indicative of a third transient output voltage of the power supply device;

determining a third frequency-domain loop response of the control loop of the power supply device by applying the machine-learned model to the third transient output voltage; and determining, based on at least one of third transient output voltage or the third frequency-domain loop response, a second value of the performance metric.

17. The computing device of claim 14, wherein the machine-learned model comprises a convolutional neural network having an encoder section and a decoder section.

18. The computing device of claim 13, wherein the power supply device comprises a switched modulated power converter.

19. The computing device of claim 16, wherein the power supply device comprises a switched-mode power converter, and wherein the compensation device comprises a compensation network.

20. The computing device of claim 19, wherein the group of operational parameters comprises compensation parameters of the compensation network, the compensation parameters corresponding to a value of an amplifier gain, a value of a resistor, and a value of a capacitor.

* * * * *